(12) United States Patent
Hirai et al.

(10) Patent No.: US 9,169,403 B2
(45) Date of Patent: Oct. 27, 2015

(54) POWDER COATING COMPOSITION FOR PC STRAND COATING, COATING METHOD, AND COATING FILM

(75) Inventors: Tomoyuki Hirai, Osaka (JP); Yoshitaka Ishihara, Osaka (JP); Koichiro Natori, Hyogo (JP); Toshihiko Niki, Hyogo (JP); Yoshihiko Touda, Hyogo (JP); Takayuki Yamagiwa, Hyogo (JP)

(73) Assignees: NIPPON PAINT CO., LTD., Osaka (JP); SUMITOMO (SEI) STEEL WIRE CORP., Hyogo (JP)

( * ) Notice: Subject to any disclaimer, the term of this patent is extended or adjusted under 35 U.S.C. 154(b) by 1368 days.

(21) Appl. No.: 12/733,289

(22) PCT Filed: Aug. 22, 2008

(86) PCT No.: PCT/JP2008/065003
§ 371 (c)(1),
(2), (4) Date: May 10, 2010

(87) PCT Pub. No.: WO2009/025355
PCT Pub. Date: Feb. 26, 2009

(65) Prior Publication Data
US 2010/0233478 A1 Sep. 16, 2010

(30) Foreign Application Priority Data
Aug. 23, 2007 (JP) .................. 2007-217453

(51) Int. Cl.
| C08L 63/00 | (2006.01) |
| B05D 1/04 | (2006.01) |
| B05D 1/18 | (2006.01) |
| D02G 3/00 | (2006.01) |
| C09D 5/03 | (2006.01) |
| C08G 59/62 | (2006.01) |
| C09D 163/00 | (2006.01) |
| D07B 1/06 | (2006.01) |

(52) U.S. Cl.
CPC ............... C09D 5/03 (2013.01); C08G 59/621 (2013.01); C09D 5/037 (2013.01); C09D 163/00 (2013.01); D07B 1/0693 (2013.01); *D07B 2201/2044* (2013.01); *D07B 2205/206* (2013.01); *D07B 2205/2057* (2013.01); *D07B 2501/2023* (2013.01); *Y10T 428/2933* (2015.01)

(58) Field of Classification Search
CPC ....................................................... C08L 63/00
USPC ................. 523/400; 428/375; 427/430.1, 458
See application file for complete search history.

(56) References Cited

U.S. PATENT DOCUMENTS

| 4,088,708 A * | 5/1978 | Riew .............................. 525/113 |
| 5,208,077 A | 5/1993 | Proctor et al. |
| 6,200,678 B1 | 3/2001 | Hunt et al. |
| 2003/0134125 A1* | 7/2003 | Facke et al. ................. 428/423.1 |
| 2004/0235984 A1* | 11/2004 | Nicholl et al. ................. 523/200 |
| 2007/0023736 A1* | 2/2007 | Shinohara et al. ............ 252/500 |
| 2008/0009602 A1 | 1/2008 | Hanafusa et al. |

FOREIGN PATENT DOCUMENTS

| EP | 0 110 542 | 6/1984 |
| JP | 59-130960 | 7/1984 |
| JP | 2-33386 | 2/1990 |
| JP | 6-504818 | 6/1994 |
| JP | 2002-194682 | 7/2002 |
| JP | 2004-2792 | 1/2004 |
| JP | 2004-131606 | 4/2004 |
| JP | 2005-220327 | 8/2005 |
| JP | 2007-161775 | 6/2007 |
| WO | 2005/073328 | 8/2005 |
| WO | 2005/123799 | 12/2005 |

OTHER PUBLICATIONS

International Search Report issued Nov. 25, 2008 in International (PCT) Application No. PCT/JP2008/065003.

* cited by examiner

*Primary Examiner* — Megan McCulley
(74) *Attorney, Agent, or Firm* — Wenderoth, Lind & Ponack, L.L.P.

(57) ABSTRACT

A powder coating composition for PC strand coating which, when used for the coating of a PC strand, can advantageously form a coating film having an even thickness at low cost without causing uneven thickness or stringness is disclosed. The powder coating composition of this invention for PC strand coating is characterized by having a melt viscosity of 3,000-15,000 poise.

15 Claims, No Drawings

POWDER COATING COMPOSITION FOR PC STRAND COATING, COATING METHOD, AND COATING FILM

TECHNICAL FIELD OF THE INVENTION

The present invention relates to a powder coating composition for PC strand coating, a coating method for PC strand and coating film obtained therein.

BACKGROUND OF THE INVENTION

A prestressed concrete (hereafter referred to as "PC") has tensioned strand in the concrete at installation, which has improved resistance of crack under tension because of its compression force. Thus using the prestressed concrete can provide improved load bearing structure. Applying a synthetic adhesive resin coating with a surface of the PC strand has been conducted to improve corrosion prevention effect of the tensioned strand in the prestressed concrete.

A method of an electrostatic powder coating or an immersion coating under flowing using a powder coating composition has been generally conducted as a method for coating a PC strand with a synthetic resin. Specifically, a method for electrostatic powder coating of a strand with a partially-cured thermosetting epoxy resin is disclosed in a patent literature 1 (Japan patent publication of JP S59 (1984)-130960 A1). In addition, a method for immersion coating under flowing including heating PC strand with plural single wires mutually twisted, and attaching synthetic resin powder in a untwisted manner, heating to melt the resin powder and returning to the original twisted state is disclosed in a patent literature 2 (Japan patent publication of JP H02 (1990)-033386 A1).

However, an immersion coating under flowing of a strand with a conventional powder coating composition may often provide uneven thickness, which has various film thicknesses in a cross section of PC strand.

On the other hand, an electrostatic immersion coating under flowing, which is a combination coating method of an immersion coating under flowing and electrostatic application to a coating composition in order to improve an attachment of a coating composition, may often provide uneven thickness and stringiness. The stringiness is a phenomenon of spinning a synthetic fiber by melting coating film in a flow direction of air.

In these methods, a film thickness of more than 1200 μm is provided in a thick film part in order to fulfill a minimum film thickness within standards, which leads to high expense because of increase of attachment amount of a powder coating composition. In addition, such thick film may counteract fixing of the strand by a fix tool and sliding when the obtained PC strand is put under stress.

In order to prevent uneven thickness, an electrostatic powder coating method (hereafter referred to as "electrostatic gun powder coating") can be applied instead of the electrostatic immersion coating under flowing. The coating method however needs installation of multiple spray guns around the strand. The coating method furthermore needs sensitive control of the number of spray guns, amount of discharged coating composition from the spray guns and a discharge direction of the spray guns. Defection of such control may provide increase of used amount of a coating composition or decrease the yield caused by a fault of that thickness, which leads to high expense.

Patent literature 1: Japan patent publication of JP S59 (1984)-130960 A1
Patent literature 2: Japan patent publication of JP H02 (1990)-033386 A1

DISCLOSURE OF THE INVENTION

Problems to be Solved by the Invention

It is therefore an object of the present invention to provide a powder coating composition for PC strand coating which can provide even film thickness at low cost without uneven thickness or stringiness in PC strand coating.

SUMMARY OF THE INVENTION

The present invention provides a powder coating composition for PC strand coating, wherein the powder coating composition has a melt viscosity of 3000 to 15000 poise.

The powder coating composition may preferably comprise an epoxy resin and a phenolic curing agent.

The epoxy resin may preferably have epoxy equivalents of 1000 to 4700 g/eq.

The powder coating composition may preferably comprise a resin obtained by partially-reacted an epoxy resin with a phenolic curing agent.

The resin may preferably be obtained by partially-reacting an epoxy resin having epoxy equivalents of 1000 to 2000 g/eq. and a phenolic curing agent.

The present invention also provide a coating method for PC strand comprising a step of continuously-coating of the powder coating composition in finely-powdered form on a PC strand under closed condition.

The coating method for PC strand may preferably be an immersion coating method.

The coating method for PC strand may also preferably be an electrostatic immersion coating method.

The present invention also provides a coating film obtained by the above coating method.

The coating film may preferably have a breaking elongation percentage of not less than 30%.

ADVANTAGEOUS EFFECT OF THE INVENTION

The powder coating composition for PC strand coating according to the present invention can provide even film thickness without uneven thickness or stringiness in PC strand coating thanks to containing the above components.

In addition, the powder coating composition for PC strand coating can easily form an excellent coating film, which provides a coating of PC strand at low cost.

DETAILED DESCRIPTION OF THE INVENTION

Hereafter, the present invention is described in detail.

The present invention relates to a powder coating composition for PC strand coating, wherein the powder coating composition has a melt viscosity of 3000 to 15000 poise. The powder coating composition of the present invention has the specific range of a melt viscosity, which provides a control of the rate of a melt flow of the coating composition. Thus the powder coating composition for PC strand coating according to the present invention can provide even film thickness without uneven thickness or stringiness in PC strand coating by immersion coating under flowing or electrostatic powder coating.

The term "uneven thickness" is described below. A coating composition having a low melt viscosity tends to fuse itself because of its fast thermal fusion. In an immersion coating under flowing, a powder coating composition having a low melt viscosity provides various film thicknesses based on density of the powder coating composition around a heated strand, e.g., a thick film of high density of the powder coating composition and a thin film of low density of the powder coating composition. The term "uneven thickness", as used herein, refers to the above unevenness of the film thicknesses formed all around strand surface. The uneven thickness provides a deterioration of a film property or a corrosion resistance, or a loss of a coating composition caused by a thick film.

The term "stringiness", as used herein, refers to a phenomenon of spinning as described above. It is a phenomenon of stringlike sagging in a preheated electrostatic coating of a powder coating composition based on its low melt viscosity. The stringiness has a problem of a significant deterioration of a coating workability caused by a pipe clog of a coating machine, or a significant deterioration of a film flatness cased by attached spinning on a coating film.

The powder coating composition of the present invention can successfully attach to a PC strand, which leads to mitigation of usage amount of a coating composition, and prevention of decrease of attachment amount based on unevenness. The present invention can achieve lowing of manufacture cost and prevention of deterioration of film flatness.

The powder coating composition according to the present invention has a melt viscosity of 3000 to 15000 poise. The above-identified melt viscosity of the powder coating composition for PC strand coating can provide even film thickness at low cost without uneven thickness or stringiness by immersion coating under flowing or electrostatic immersion coating under flowing.

If the melt viscosity of a coating composition is lower than 3000 poise, a resulting coating film may have uneven thickness caused by much coating composition attachment in passing a heated strand through higher density of the coating composition. If the melt viscosity of a coating composition is higher than 15000 poise, a resulting coating film may have deteriorated film appearance caused by defection of coating amount or insufficient leveling caused by insufficient melting and flowing of the coating composition on a preheated substrate. The melt viscosity may preferably be within a range of 3000 to 10000 poise.

The term "melt viscosity", as used herein, refers to a lowest melt viscosity value in time-dependent measuring a viscosity of a coating composition under the condition of heating at a rate of 20° C. per minute to a specified temperature and keeping the specified temperature. A complex viscosity measured by dynamic viscoelastic method can preferably be used for the measurement of the melt viscosity.

A powder coating composition for PC strand coating according to the present invention may preferably contain an epoxy resin and a phenolic curing agent. A powder coating composition containing the epoxy resin and the phenolic curing agent has melt viscosity within the above range, which can provide even film thickness on a surface of a PC strand without uneven thickness or stringiness by immersion coating under flowing or electrostatic immersion coating under flowing. The powder coating composition containing the above resin components can provide a coating film having excellent corrosion resistance and excellent flexibility, which can be preferably used for coating of a wire used in a flexed condition.

The above epoxy resin may illustrate by an example of a compound having two or more epoxy group in a molecular.

In particular example, a reaction product of novolac-type phenolic resin with epichlorohydrin;
a reaction product of bisphenol epoxy resin (A, B or F-type) with epichlorohydrin;
a reaction product of reacting novolac-type phenolic resin, bisphenol epoxy resin (A, B or F-type) and epichlorohydrin;
a reaction product of cresol compound such as cresol novolac with epichlorohydrin;
glycidyl ether obtainable from a reaction of alcohol compound such as ethylene glycol, propylene glycol, 1,4-butanediol, polyethylene glycol, polypropylene glycol, neopentyl glycol or glycerol with epichlorohydrin;
glycidyl ester obtainable from a reaction of carboxilic acid compound such as succinic acid, adipic acid, sebacylic acid, phthalic acid, telephthalic acid, hexahydrophthalic acid or trimellitic acid with epichlorohydrin;
a reaction product of hydroxy carboxilic acid such as p-oxy benzoic acid or β-oxy naphthoic acid with epichlorohydrin; or
triglycidyl isocyanurate and the derivatives; may be used as the epoxy resin.

An epoxy group-containing acrylic resin may be used as the epoxy resin.

For example, a reaction product obtained from conventional copolymerization of epoxy group-containing monomer such as glycidyl acrylate, glycidyl methacrylate, 2-methyl glycidyl methacrylate, which is an essential component; hydroxy group-containing monomer such as 2-hydroxyethyl (meth)acrylate, 2-hydroxypropyl (meth)acrylate, 4-hydroxybutyl (meth)acrylate, reaction product of 2-hydroxyethyl (meth)acrylate with polycaprolactone, polyalkylene glycol mono(meth)acrylate; and
radical polymeric monomer such as methyl (meth)acrylate, ethyl (meth)acrylate, n-butyl (meth)acrylate, iso-butyl (meth) acrylate, tert-butyl (meth)acrylate, styrene, vinyl toluene, p-chlorostyrene; may be used as the epoxy resin.

The above-listed epoxy resins may be used alone or in any combination thereof.

Bisphenol A epoxy resin which is a reaction product of bisphenol resin (A-type) with epichlorohydrin may be preferably used because a required quality for PC strand includes excellent corrosion resistance and excellent flexibility.

The epoxy resin may preferably have epoxy equivalents of 1000 to 4700 g/eq. Using the epoxy resin having epoxy equivalents within the above range can provide a powder coating composition having a melt viscosity within the above range. And a coating film of even film thickness without uneven thickness or stringiness in PC strand coating can be formed by use of the above epoxy resin. If the epoxy equivalent is lower than 1000 g/eq., flexibility of the resulting coating film may be deteriorated. If the epoxy equivalent is higher than 4700 g/eq., preparation of a powder coating composition may become difficult.

The epoxy equivalent is a numerical value obtained by dividing a molecular weight by the mean number of epoxy group. The term "epoxy equivalent" of an epoxy resin in a powder coating composition, as used herein, can be obtained according to JIS K 7236 (2001), which is a Japanese Industrial Standards corresponding to ISO 3001. The epoxy resin used herein contains a partial reacting resin product of an epoxy resin with a phenolic curing agent. In particular, the term "epoxy equivalent" of an epoxy resin in a powder coating composition according to the present invention may preferably refer to an epoxy equivalent measured by a potentiometric method according to JIS K 7236 (2001).

Commercialized products, for example of the above, Epicoat 1006F, Epicoat 1007, Epicoat 1009 (trade name, available from Japan Epoxy Resin Co., Ltd.), or Epotote YD-904H, Epotote YD-907, YD-909 (trade name, available from Tohto Kasei Co., Ltd.) may be used for the epoxy resin.

In the present invention, conventional phenolic curing agents may be used.

Examples of the phenolic curing agents include, but are not limited to, phenol;

a substituted phenols which is substituted at o-, p- or m-position of phenol by $C_1$-$C_{12}$ alkyl group (such as methyl group, ethyl group, propyl group, butyl group or octyl group), halogen atom (such as fluorine, chlorine or bromine), nitro group, $C_1$-$C_4$ alkoxy group (such as methoxy group, ethoxy group, propoxy group or butoxy group), amino group, alkyl-substituted amino group (such as dimethylamino group or diethylamino group);

one or more hydroxyl group-containing phenol such as resorcin, phloroglucinol or pyrogallol;

cresols; ethyl phenols; butyl phenols; octyl phenols; chloro phenols; bromo phenols;

polyphenol such as tris-hydroxy phenyl methane, bisphenol A, bisphenol F, biephenol S, bisphenol C, 2,2',6,6'-tetramethyl-4,4'-biphenyl phenol, 4,4'-biphenyl phenol, tetrabromobisphenol A; or naphthol such as α-naphthol, β-naphthol, 1,4-dihydroxy naphthalene or 2,6-dihydroxy naphthalene.

The above-listed phenolic curing agent may be used alone or in any combination thereof. A diglycidylether-modified bisphenol A may be preferably used for the phenolic curing agent.

A phenolic hydroxy equivalent of the phenolic curing agent may preferably be within a range of 500 to 800 g/eq. Using the phenolic curing agent having phenolic hydroxy equivalent within the above range can achieve a form of coating film having excellent flexibility for PC strand. If the phenolic hydroxy equivalent is lower than 500 g/eq., sufficient flexibility or desired melt viscosity required for coating material may not be obtained. If the phenolic hydroxy equivalent is higher than 800 g/eq., it is difficult to purchase those phenolic curing agent in commercially. A phenolic hydroxy equivalent of the phenolic curing agent may more preferably be within a range of 600 to 800 g/eq.

Commercialized products, for example, Epotote ZX-798P (trade name, available from Tohto Kasei Co., Ltd.) or EPIcure 170, 171N (trade name, available from Japan Epoxy Resin Co., Ltd.) may be used for the phenolic curing agent.

A powder coating composition for PC strand coating according to the present invention may also contain a resin obtained by partially-reacting the epoxy resin and the phenolic curing agent.

By containing of partially-reacted the epoxy resin with the phenolic curing agent, a powder coating composition having desired melt viscosity can be obtained.

A conventional method for partially-reacting the epoxy resin and the phenolic curing agent method can be used. Examples of the method include, but are not limited to, controlling a heating time or a heating temperature of the reaction mixture of the epoxy resin and the phenolic curing agent, selecting the curing catalyst or controlling an amount of the curing catalyst.

The partially-reacting resin may be preferably used if an epoxy resin having an epoxy equivalents of 1000 to 2000 g/eq. is used for preparing a powder coating composition. The partially-reacting resin obtained by partially-reacting the epoxy resin and the phenolic curing agent in a powder coating composition may preferably have epoxy equivalents of 1800 to 4700 g/eq. Using the partially-reacting the epoxy resin and the phenolic curing agent can achieve an easy preparation of a powder coating composition having desired melt viscosity. In addition, applying the resulting powder coating composition on a PC strand can achieve a form of coating film having an even film thickness without uneven thickness or stringiness.

The partially-reacting resin obtained by partially-reacting the epoxy resin and the phenolic curing agent may be used, even though an epoxy resin having a epoxy equivalents of 1000 to 4700 g/eq. is used for preparing a powder coating composition. Using the partially-reacting resin can achieve an easy preparation of a powder coating composition having desired melt viscosity thanks to a rise of the melt viscosity.

The epoxy resin in a powder coating composition according to the present invention, or an epoxy resin which is used for the above partially-reaction may preferably have not less than 90% of a content of terminal epoxy group based on a total number of epoxy group. Using such an epoxy resin can achieve a formation of a continuous coating film having good flexibility thanks to an increase of crosslink density. If the content of terminal epoxy group is less than 90%, a formation of a continuous coating film having good flexibility may not be achieved.

A mixing ratio of the epoxy resin and the phenolic curing agent, which is a equivalent ratio of a phenolic hydroxyl equivalent of the phenolic curing agents based on an epoxy equivalent of the epoxy resin, may preferably be within a range of 0.7/1.0 to 1.5/1.0. If the mixing ratio is lower than 0.7/1.0, bend processability may be deteriorated because of insufficient crosslinking and lack of flexibility. If the mixing ratio is higher than 1.5/1.0, corrosion resistance may be deteriorated because excess amount of the phenolic curing agent may exist. The mixing ratio may more preferably be within a range of 1.0/1.0 to 1.2/1.0.

A powder coating composition according to the present invention may contain optional surface conditioner, delusterant, thickening agent, coloring agent, anti-corrosive pigment, body pigment, plasticizer and the like other than the above-listed component.

Adding a curing catalyst to an epoxy resin and a phenolic curing agent can accelerate a reaction of the epoxy resin and the phenolic curing agent to obtain a coating composition having desired melt viscosity. Examples of the curing catalyst include imidazoles, imidazolines and the like. Examples of the imidazoles include 2-methylimidazole, 2-phenylimidazole, 2-ethylimidazole, 2-undecylimidazole, 2-heptadecylimidazole and the like. Examples of the imidazolines include 2-ethylimidazoline, 2-phenylimidazoline, 1-cyanoethyl-2-phenylimidazoline and the like. A weight amount of the imidazoles and/or imidazolines may preferably be within the range of 0 to 10 weight parts based on 100 weight parts of the epoxy resin. If the weight amount is more than 10 weight parts, a flow property of a coating composition may be deteriorated because of excess acceleration of the reaction. The weight amount of the imidazoles and/or imidazolines may more preferably be within the range of 1 to 3 weight parts.

Examples of the surface conditioner include silicone such as dimethyl silicone and methylphenyl silicone, acryl oligomer and the like.

Examples of the delusterant include conventional waxes, the following body pigments and the like. Examples of the thickening agent include colloidal silica, bentonite and the like. Examples of the coloring agent include titanium dioxide, colcothar, iron oxide, zinc powder, carbon black, phthalocyanine blue, phthalocyanine green, quinacridone-type pigment, azo-type pigment, isoindoline-type pigment, various burned pigments and the like. Examples of the anti-corrosive pigment include aluminium tripolyphosphate and the like. Examples of the body pigment include alumina, talc clay, calcium carbonate, barium sulfate, silica, glass flakes and the like. Examples of the plasticizer include epoxidized soybean oil and the like.

Another additives for the powder coating composition include ultraviolet absorber, antioxidizing agent, pin-hole inhibitor, pigment dispersant and the like. Conventional additives used for an epoxy powder coating composition can be used for the additives.

A volume mean particle diameter of a powder coating composition according to the present invention may preferably be, but not limited to, 40 to 80 μm in perspective of flow property and coated yield. The volume mean particle diameter can be measured with a particle size distribution indicator (MICROTRAC HRA, available from NIKKISO Co., Ltd.).

A method for preparing a powder coating composition according to the present invention may be a conventional method in the art of a powder coating composition.

Examples of the method include a method of
preparing raw materials including the epoxy resin, the phenolic curing agent (these two components are essential components) and the additives,
dry-mixing the raw materials with a super mixer, henschel mixer or the like,
melt-kneading a resulting mixture with a kneader such as busco kneader or extruder under a temperature of no-reaction of the epoxy resin and the phenolic curing agent, or a temperature with a reaction of the epoxy resin and the phenolic curing agent subject to usable for a powder coating, and
milling and classfying the resultant after cooling.

In addition, a flow modifier or an antistatic agent may be added to the resulting powder coating composition. Use of the flow modifier can improve anti-blocking property as well as improvement of flow property of the powder coating composition. Examples of the flow modifier include hydrophobic silica, hydrophilic silica, aluminum oxide, titanium oxide and the like.

A coating method for a powder coating composition for PC strand coating according to the present invention may include a step of continuously-coating of the powder coating composition in finely-powdered form on a PC strand under closed condition. The above coating method can achieve an excellent formation of coating film on a PC strand without uneven thickness or stringiness in use of a powder coating composition according to the present invention.

A preferable example of a coating method in finely-powdered form under closed condition may be an immersion coating under flowing.

The immersion coating under flowing is a method of adding a powder coating composition into an immersion bath, blowing an air from below to fludize the powder coating composition,
immersing a coating substrate, which is pre-heated, and thermal-fusing the powder coating composition on a surface of the coating substrate by heat quantity of the substrate to form a coating film.

The above immersion coating under flowing of PC strand using a powder coating composition according to the present invention can achieve an excellent formation of coating film on a PC strand without uneven thickness, and, is preferable.

The above immersion coating under flowing to coat PC strand may be conventional coating procedure, for example, attaching and fixing a fluidized powder coating composition on a PC strand as a coating substrate in an immersion bath present blowing air from below. Concrete coating step is described in JP H03(1991)-001436 B and is known in the skilled art.

It may be a method for immersion coating under flowing including:
heating PC strand with plural single wires mutually twisted,
unwinding the PC strand to separate single wires composing the PC strand,
attaching synthetic resin powder in a untwisted manner,
heating to melt the resin powder and
returning to the original twisted state to form a resin coating film on and in the PC strand.

A heating temperature for coated PC strand may preferably be within a range of 180 to 240° C. If the temperature is lower than 180° C., inadequate curing of PC strand coating may be obtained. If the temperature is higher than 240° C., strength property of PC strand materials may be deteriorated.

A preferable example of a coating method in finely-powdered form under closed condition may be an electrostatic immersion coating under flowing. The electrostatic immersion coating under flowing is a coating method of applying static electrical charge on a powder coating composition in immersion coating under flowing. For more details, the method includes a step of immersing a coating substrate, which is pre-heated, to provide electrostatic-attachment for a powder coating composition on the substrate.

After PC strand coating of a powder coating composition according to the present invention by the immersion coating under flowing or the electrostatic immersion coating under flowing, the resultant coating film is baked to cure the coating film. A condition of baking coating film is not limited and may be conventional condition of baking temperature and baking time, for example, 200 to 220° C. for 1 to 5 minutes. A powder coating composition according to the present invention may also be used in an electrostatic powder coating method.

A coating film obtained by the present invention may preferably be used for bending usage such as PC strand, which is one of the present inventions. A breaking elongation percentage of the coating film may preferably be not less than 30%. The breaking elongation percentage can be obtained by a tensile test according to JIS K 7113. If the breaking elongation percentage is less than 30%, defect of coating film may be obtained. The breaking elongation percentage may more preferably be not less than 60%.

A film thickness of the coating film may preferably be within a range of 400 to 1200 μm. If the film thickness is less than 400 μm, corrosion resistance of the coating film may be deteriorated. If the film thickness is more than 1200 μm, high production cost may be needed because of increase of attachment amount of a powder coating composition. In addition, such thick coating film may counteract fixing of steel strand by a fix tool to slide. The film thickness of the coating film may more preferably be within a range of 500 to 900 μm.

EXAMPLES

The present invention will be further explained in detail in accordance with the following examples, but it is not construed as limiting the present invention to these examples. In the examples, "part" and "%" are based on weight unless otherwise specified.

Production Example 1

Composition A of a Powder Coating Composition

Epoxy resin in 60 weight parts (Epotote YD-909, bisphenol-A epoxy resin, epoxy equivalents of 2200 g/eq., available from Tohto Kasei Co., Ltd.), 15 weight parts of phenolic curing agent (Epotote ZX-798P, phenolic hydroxy equivalents of 700 g/eq., available from Tohto Kasei Co., Ltd.), 1 weight part of coloring pigment (Fastogen blue NK), and 1 weight part of curing catalyst (Curezol C11Z, available from Shikoku chemicals corporation) were added, then the resultant was uniformly dry-mixed using a kneader and melt-kneaded at 120° C. for 5 minutes. Then the resulting mixture was milled and classified after cooling to obtain a powder coating composition.

Production Example 2

Composition B of a Powder Coating Composition

Epoxy resin in 60 weight parts (Epotote YD-907, bisphenol-A epoxy resin, epoxy equivalents of 1500 g/eq., available from Tohto Kasei Co., Ltd.), 20 weight parts of phenolic curing agent (Epotote ZX-798P, phenolic hydroxy equivalents of 700 g/eq., available from Tohto Kasei Co., Ltd.), 1 weight part of coloring pigment (Fastogen blue NK), and 1 weight part of curing catalyst (Curezol C11Z, available from Shikoku chemicals corporation) were added, then the resultant was uniformly dry-mixed using a kneader and melt-kneaded at 120° C. for 5 minutes. Then the resulting mixture was milled and classified after cooling to obtain a powder coating composition.

Production Example 3

Composition C of a Powder Coating Composition

Epoxy resin in 60 weight parts (Epotote YD-903, epoxy equivalents of 840 g/eq., available from Tohto Kasei Co., Ltd.), 40 weight parts of phenolic curing agent (Epotote ZX-798P, phenolic hydroxy equivalents of 700 g/eq., available from Tohto Kasei Co., Ltd.), 1 weight part of coloring pigment (Fastogen blue NK), and 1 weight part of curing catalyst (Curezol C11Z, available from Shikoku chemicals corporation) were added, then the resultant was uniformly dry-mixed using a kneader and melt-kneaded at 120° C. for 5 minutes. Then the resulting mixture was milled and classified after cooling to obtain a powder coating composition.

Production Example 4

Composition D of a Powder Coating Composition

Epoxy resin in 60 weight parts (Epicoat 1010, epoxy equivalents of 4500 g/eq., available from Japan Epoxy Resin Co., Ltd.), 10 weight parts of phenolic curing agent (Epotote ZX-798P, phenolic hydroxy equivalents of 700 g/eq., available from Tohto Kasei Co., Ltd.), 1 weight part of coloring pigment (Fastogen blue NK), and 1 weight part of curing catalyst (Curezol C11Z, available from Shikoku chemicals corporation) were added, then the resultant was uniformly dry-mixed and melt-kneaded at 120° C. for 5 minutes using a kneader. Then the resulting mixture was milled after cooling, but the milling was difficult. Thus a powder coating composition was not obtained.

Production Example 5

Composition E of a Powder Coating Composition

Epoxy resin in 60 weight parts (Epotote YD-904H, epoxy equivalents of 1000 g/eq., available from Tohto Kasei Co., Ltd.), 35 weight parts of phenolic curing agent (Epotote ZX-798P, phenolic hydroxy equivalents of 700 g/eq., available from Tohto Kasei Co., Ltd.), 1 weight part of coloring pigment (Fastogen blue NK), and 1 weight part of curing catalyst (Curezol C11Z, available from Shikoku chemicals corporation) were added, then the resultant was uniformly dry-mixed using a kneader and melt-kneaded at 120° C. for 5 minutes. Then the resulting mixture was milled and classified after cooling to obtain a powder coating composition.

Production Example 6

Composition F of a Powder Coating Composition

Epoxy resin in 45 weight parts (Epicoat 1010, epoxy equivalents of 4500 g/eq., available from Japan Epoxy Resin Co., Ltd.), 15 weight parts of Epoxy resin (Epotote YD-909, epoxy equivalents of 2200 g/eq., available from Tohto Kasei Co., Ltd.), 10 weight parts of phenolic curing agent (Epotote ZX-798P, phenolic hydroxy equivalents of 700 g/eq., available from Tohto Kasei Co., Ltd.), 1 weight part of coloring pigment (Fastogen blue NK), and 1 weight part of curing catalyst (Curezol C11Z, available from Shikoku chemicals corporation) were added, then the resultant was uniformly dry-mixed using a kneader and melt-kneaded at 120° C. for 5 minutes. Then the resulting mixture was milled and classified after cooling to obtain a powder coating composition.

Example 1

Composition A of the powder coating composition was used as a powder coating composition in Example 1.

Example 2

Composition A of the powder coating composition was kept at a heating temperature of 40° C. and measured a viscosity of the coating composition at regular time intervals. A powder coating composition when its melt viscosity was achieved a specified melt viscosity in Table 1 was used as a powder coating composition in Example 2.

Example 3

A powder coating composition was prepared in the same manner as in Example 2 except that the specified melt viscosity in Table 1 was used. The resultant powder coating composition was used in Example 3.

Example 4

A powder coating composition was prepared in the same manner as in Example 2 except that the specified melt viscosity in Table 1 was used and composition B of the powder coating composition was used in place of composition A in the Example 2. The resultant powder coating composition was used in Example 4.

Example 5

A powder coating composition was prepared in the same manner as in Example 2 except that the specified melt viscosity in Table 1 was used and composition B of the powder coating composition was used in place of composition A in the Example 2. The resultant powder coating composition was used in Example 5.

Example 6

A powder coating composition was prepared in the same manner as in Example 2 except that the specified melt viscosity in Table 1 was used and composition B of the powder coating composition was used in place of composition A in the Example 2. The resultant powder coating composition was used in Example 6.

Example 7

A powder coating composition was prepared in the same manner as in Example 2 except that the specified melt viscosity in Table 1 was used and composition E of the powder coating composition was used in place of composition A in the Example 2. The resultant powder coating composition was used in Example 7.

Example 8

Composition F of the powder coating, composition was used as a powder coating composition in Example 8.

Comparative Example 1

A powder coating composition was prepared in the same manner as in Example 2 except that the specified melt viscosity in Table 1 was used and composition B of the powder coating composition was used in place of composition A in the Example 2. The resultant powder coating composition was used in Comparative example 1.

Comparative Example 2

A powder coating composition was prepared in the same manner as in Example 2 except that the specified melt viscosity in Table 1 was used and composition B of the powder coating composition was used in place of composition A in the Example 2. The resultant powder coating composition was used in Comparative example 2.

Comparative Example 3

Composition B of the powder coating composition was used as a powder coating composition in Comparative example 3.

Comparative Example 4

A powder coating composition was prepared in the same manner as in Example 2 except that the specified melt viscosity in Table 1 was used. The resultant powder coating composition was used in Comparative example 4.

Comparative Example 5

A powder coating composition was prepared in the same manner as in Example 2 except that the specified melt viscosity in Table 1 was used and composition C of the powder coating composition was used in place of composition A in the Example 2. The resultant powder coating composition was used in Comparative example 5.

The obtained powder coating compositions were subjected to the following tests.

Melt Viscosity

The obtained powder coating composition (0.4 g) was pressed to form a pellet (2 cm in diameter). A minimum complex viscosity of the powder coating composition was measured using the pellet with a cone-plate type dynamic viscoelastic measurement device (RHEOSOL-G3000, available from UBM corporation) under the following conditions.

initiation temperature: 120° C.
rate of temperature increase: 20° C./minute
achieving temperature: 200° C.
diameter of cone: 1.73 cm
inclination angle of cone: 1.92
frequency: 2 Hz "Required time" in Table 1 shows a time which was taken to achieve the specified melt viscosity shown table 1 under a heating temperature of 40° C. in the preparation of the above powder coating compositions.

Epoxy Equivalents of Epoxy Resin in Powder Coating Composition

An epoxy equivalent of epoxy resin in powder coating composition was measured by potentiometric method according to JIS K 7236 (2001). A resin obtained by partially-reacting an epoxy resin and a phenolic curing agent is included in the epoxy resin.

Uniformity of Coating Film

The obtained powder coating composition was applied to PC strand by immersion coating under flowing. A film thickness of the obtained coating film on PC strand was measured with an electromagnetic film thickness meter. Minimum film thickness in use of PC strand is 400 μm. In the present invention, a minimum thickness was set at 500 μm in order to ensure an intended film property. Variability of film thickness in the coating film on PC strand was evaluated under the following criteria.

A: 500 to 700 μm
B: 500 to 800 μm
C: 500 to 1000 μm
D: 500 to more than 1000 μm

Stringiness

Stringiness incidence in coating procedure was evaluated under the following criteria.

A: there was no stringiness
B: there was a little stringiness, however, which had little influence on coating line.
C: there was some stringiness, which needed to remove in coating line.
D: there was a lot of stringiness, which made impossible to apply in coating line.

PC Strand Property

PC strand property of the obtained PC strand after coating was evaluated. A sample which fulfilled the criteria of PC strand in ASTM A882 was rated as "acceptance".

Breaking Elongation Percentage of Coating Film

Free coating film (coating film without substrate) having film thickness of 600 μm was formed using the above powder coating compositions. The coating film was elongated with Tensilon-type H tensile-stretch universal testing device under the following measurement condition, and breaking elongation of the film was measured.

Breaking elongation=(elongation at break)/(original size)×100

A sample having percentage elongation (average value) of not less than 30% was rated as "acceptance".

Measurement Condition

Testing device: Tensilon-type tensile-stretch universal testing device (A&D Company Ltd.)
Tension condition: 10 mm/minute
Measurement temperature: 23° C.

Comprehensive Evaluation

Comprehensive evaluation in use of coating for PC strand was performed based on the above coating film evaluation.

A: most suitable for coating PC strand
B: suitable for coating PC strand
C: not good for coating PC strand
D: unsuitable for coating PC strand

TABLE 1

|  | Example 1 | Example 2 | Example 3 | Example 4 | Example 5 | Example 6 | Example 7 |
|---|---|---|---|---|---|---|---|
| Powder coating composition | composition A | composition A | composition A | composition B | composition B | composition B | composition E |
| Specified melt viscosity (poise) | 5000 | 7000 | 15000 | 6000 | 5000 | 3000 | 5000 |
| required time (40° C.) | no time | 1 day | 7 days | 7 days | 5 days | 4 days | 7 days |
| Epoxy equivalents of epoxy resin in powder coating composition (g/eq) | 2800 | 2850 | 3100 | 2250 | 2190 | 2140 | 1820 |
| Uniformity of coating film thickness evaluation | B | A | A | A | B | B | B |
| film thickness(μm) | 500~800 | 500~650 | 500~650 | 500~700 | 500~750 | 500~800 | 500~750 |
| Stringiness | B | A | A | A | B | B | B |
| PC strand property | acceptance | acceptance | acceptance | acceptance | acceptance | acceptance | acceptance |
| Breaking elongation percentage of coating film (%) | acceptance | acceptance | acceptance | acceptance | acceptance | acceptance | acceptance |
| Comprehensive evaluation | B | A | A | A | B | B | B |

|  | Example 8 | Comparative example 1 | Comparative example 2 | Comparative example 3 | Comparative example 4 | Comparative example 5 |
|---|---|---|---|---|---|---|
| Powder coating composition | composition F | composition B | composition B | composition B | composition A | composition C |
| Specified melt viscosity (poise) | 7000 | 2500 | 2000 | 1500 | 16000 | 2900 |
| required time (40° C.) | no time | 3 days | 1 day | no time | 8 days | 7 days |
| Epoxy equivalents of epoxy resin in powder coating composition (g/eq) | 4700 | 2100 | 2030 | 2000 | 3150 | 1640 |
| Uniformity of coating film thickness evaluation | A | C | D | D | A | B |
| film thickness(μm) | 500~650 | 500~950 | 500~1100 | 500~1200 | 500~650 | 500~750 |
| Stringiness | B | C | D | D | A | B |
| PC strand property | acceptance | acceptance | acceptance | acceptance | rejection | rejection |
| Breaking elongation percentage of coating film (%) | acceptance | acceptance | acceptance | acceptance | acceptance | acceptance |
| Comprehensive evaluation | B | C | D | D | D | D |

Shown in the above Table 1, immersion coating under flowing in use of powder coating compositions prepared in the above Examples provided coating films having excellent even film thickness, stringiness, PC strand property and film contraction rate. On the other hand, coating in use of powder coating compositions prepared in the above Comparative examples could not provide coating films having such excellent properties in all items.

Industrial Applicability

The powder coating composition for PC strand coating according to the present invention can preferably be used in coating PC strand.

The invention claimed is:

1. A powder coating composition for prestressed concrete (PC) strand coating, wherein
    the powder coating composition has a melt viscosity of 3000 to 15000 poise,
    the powder coating composition comprises an epoxy resin and a curing agent,
    the curing agent is a diglycidylether-modified bisphenol A,
    the curing agent has a phenolic hydroxy equivalent within a range of 500 to 800 g/eq,
    a mixing ratio of the epoxy resin and the curing agent, which is an equivalent ratio of a phenolic hydroxy equivalent of the curing agent to an epoxy equivalent of the epoxy resin, is within a range of 0.7/1.0 to 1.5/1.0, and
    the powder coating composition is suitable for coating PC strands.

2. The powder coating composition of claim 1 wherein the epoxy resin has epoxy equivalents of 1000 to 4700 g/eq.

3. The powder coating composition of claim 2, wherein the powder coating composition comprises a resin obtained by partially-reacting an epoxy resin with a phenolic curing agent.

4. A coating method for PC strand comprising a step of continuously-coating of the powder coating composition of claim 2 in finely-powdered form on a PC strand under a closed condition.

5. The powder coating composition of claim 1 wherein the powder coating composition comprises a resin obtained by partially-reacting an epoxy resin with a phenolic curing agent.

6. The powder coating composition of claim 5 wherein the powder coating composition comprises a resin obtained by partially-reacting an epoxy resin having epoxy equivalents of 1000 to 2000 g/eq and a phenolic curing agent.

7. A coating method for PC strand comprising a step of continuously-coating of the powder coating composition of claim 6 in finely-powdered form on a PC strand under a closed condition.

8. A coating method for PC strand comprising a step of continuously-coating of the powder coating composition of claim 5 in finely-powdered form on a PC strand under a closed condition.

9. A coating method for a prestressed concrete (PC) strand comprising a step of continuously-coating of the powder coating composition of claim 1 in finely-powdered form on a PC strand under a closed condition.

10. The coating method of claim 9 wherein the coating method is an immersion coating method.

11. A coating film obtained by the coating method of claim 10.

12. The coating film of claim 11 which has a breaking elongation percentage of not less than 30%.

13. The coating method of claim 9 wherein the coating method is an electrostatic immersion coating method.

14. A coating film obtained by the coating method of claim 13.

15. The powder coating composition of claim 1, wherein the epoxy resin has not less than 90% of a content of terminal epoxy groups based on a total number of epoxy groups.

\* \* \* \* \*